United States Patent
Shuster et al.

(10) Patent No.: US 9,595,136 B2
(45) Date of Patent: Mar. 14, 2017

(54) CREATION AND USE OF VIRTUAL PLACES

(71) Applicants: Gary Stephen Shuster, Fresno, CA (US); Brian Mark Shuster, Vancouver (CA)

(72) Inventors: Gary Stephen Shuster, Fresno, CA (US); Brian Mark Shuster, Vancouver (CA)

(*) Notice: Subject to any disclaimer, the term of this patent is extended or adjusted under 35 U.S.C. 154(b) by 0 days.

(21) Appl. No.: 14/247,190

(22) Filed: Apr. 7, 2014

(65) Prior Publication Data

US 2014/0303778 A1 Oct. 9, 2014

Related U.S. Application Data

(63) Continuation of application No. 13/155,380, filed on Jun. 7, 2011, now Pat. No. 8,694,553.

(60) Provisional application No. 61/352,071, filed on Jun. 7, 2010, provisional application No. 61/352,237, filed on Jun. 7, 2010, provisional application No. 61/375,394, filed on Aug. 20, 2010.

(51) Int. Cl.
*G06T 19/00* (2011.01)
*G06T 17/00* (2006.01)
*G06F 3/0481* (2013.01)
*G06T 17/10* (2006.01)

(52) U.S. Cl.
CPC ........ *G06T 19/003* (2013.01); *G06F 3/04815* (2013.01); *G06T 17/00* (2013.01); *G06T 17/10* (2013.01); *G06T 19/00* (2013.01)

(58) Field of Classification Search
CPC .... G06F 17/241; G06F 3/0484; G06F 3/0481; G06F 3/04815

USPC .................. 707/792, 706; 719/310; 715/757; 345/419, 420; 700/245, 264

See application file for complete search history.

(56) References Cited

U.S. PATENT DOCUMENTS

| | | |
|---|---|---|
| 5,111,392 A | 5/1992 | Malin |
| 5,633,993 A | 5/1997 | Redmann et al. |
| 5,696,892 A * | 12/1997 | Redmann ............... G06T 13/20 345/473 |
| 5,714,997 A | 2/1998 | Anderson |
| 5,729,471 A | 3/1998 | Jain et al. |
| 5,850,352 A | 12/1998 | Moezzi et al. |
| 6,028,593 A | 2/2000 | Rosenberg et al. |
| 6,124,862 A | 9/2000 | Boyken et al. |

(Continued)

FOREIGN PATENT DOCUMENTS

| | | |
|---|---|---|
| DE | 10301849 A1 | 8/2004 |
| DE | 102004024171 A1 | 9/2005 |

(Continued)

OTHER PUBLICATIONS

Article entitled "Toshiba prototype display does 2D and 3D at the same time", by Sean Hollister, posted Jun. 4, 2010 on www.engadget.com <http://www.engadget.com>.

(Continued)

*Primary Examiner* — Jean M Corrielus
(74) *Attorney, Agent, or Firm* — Sherrie Flynn; Coleman & Horowitt, LLP

(57) ABSTRACT

An apparatus, method and system facilitate efficient creation of virtual places and provide tools for using the virtual places. The virtual places include a virtual real estate listing, newsworthy place and a virtual box seat. Tools are provided including an automatic declutter tool and a staging tool.

20 Claims, 3 Drawing Sheets

(56) References Cited

U.S. PATENT DOCUMENTS

| | | | |
|---|---|---|---|
| 6,201,546 B1* | 3/2001 | Bodor | G06T 7/0022 345/420 |
| 6,906,643 B2* | 6/2005 | Samadani | G01C 7/00 340/995.1 |
| 6,912,293 B1* | 6/2005 | Korobkin | G06T 17/10 345/420 |
| 6,919,892 B1* | 7/2005 | Cheiky | G06T 13/40 345/473 |
| 7,062,722 B1 | 6/2006 | Carlin et al. | |
| 7,181,363 B2* | 2/2007 | Ratti | G06F 3/0425 702/152 |
| 7,193,633 B1* | 3/2007 | Reinhardt | G06T 17/10 345/420 |
| 7,259,761 B2* | 8/2007 | Shih et al. | 345/419 |
| 7,457,730 B2 | 11/2008 | Degnan | |
| 7,526,790 B1 | 4/2009 | Vesikivi | |
| 7,852,372 B2 | 12/2010 | Sohmers | |
| 7,882,443 B2* | 2/2011 | Fuhrmann et al. | 715/757 |
| 8,012,023 B2* | 9/2011 | Gates et al. | 463/40 |
| 8,266,536 B2* | 9/2012 | Roberts et al. | 715/757 |
| 8,339,418 B1 | 12/2012 | Nesmith | |
| 8,369,610 B1* | 2/2013 | Korobkin | G06T 17/10 382/154 |
| 8,516,396 B2* | 8/2013 | Bromenshenkel et al. | 715/848 |
| 8,523,672 B2 | 9/2013 | Kryuchkov et al. | |
| 8,584,025 B2* | 11/2013 | Dawson et al. | 715/757 |
| 8,589,809 B2* | 11/2013 | Renner | 715/757 |
| 8,737,721 B2* | 5/2014 | Arcas | G06T 17/00 345/419 |
| 8,893,049 B2* | 11/2014 | Dawson et al. | 715/851 |
| 8,898,574 B2* | 11/2014 | Hamilton et al. | 715/748 |
| 8,902,227 B2* | 12/2014 | Harrison | 345/420 |
| 9,063,565 B2* | 6/2015 | Bokor et al. | |
| 2002/0052755 A1 | 5/2002 | Whatley et al. | |
| 2004/0102244 A1 | 5/2004 | Kryuchkov et al. | |
| 2005/0017967 A1* | 1/2005 | Ratti | G06F 3/0425 345/418 |
| 2005/0075167 A1 | 4/2005 | Beaulieu et al. | |
| 2005/0113643 A1* | 5/2005 | Hale | A61B 1/00009 600/118 |
| 2005/0233799 A1 | 10/2005 | LeMay et al. | |
| 2005/0273354 A1 | 12/2005 | Adams | |
| 2006/0184884 A1 | 8/2006 | Chaturvedi | |
| 2007/0018975 A1 | 1/2007 | Chuanggui et al. | |
| 2007/0105531 A1 | 5/2007 | Schroeder | |
| 2007/0207846 A1* | 9/2007 | Burak | A63F 13/10 463/9 |
| 2007/0271301 A1* | 11/2007 | Klive | G06F 17/30041 |
| 2007/0279483 A1 | 12/2007 | Beers et al. | |
| 2007/0279484 A1 | 12/2007 | Derocher et al. | |
| 2008/0079752 A1 | 4/2008 | Gates et al. | |
| 2008/0112610 A1* | 5/2008 | Israelsen | G06T 17/00 382/154 |
| 2008/0188304 A1 | 8/2008 | Escalera et al. | |
| 2008/0215972 A1* | 9/2008 | Zalewski | A63F 13/31 715/706 |
| 2008/0307473 A1 | 12/2008 | Allen | |
| 2009/0013263 A1 | 1/2009 | Fortnow et al. | |
| 2009/0062001 A1 | 3/2009 | LeMay et al. | |
| 2009/0147003 A1* | 6/2009 | Do | G06T 15/205 345/427 |
| 2009/0267960 A1 | 10/2009 | Finn et al. | |
| 2009/0279784 A1* | 11/2009 | Arcas | G06T 17/00 382/190 |
| 2010/0005424 A1* | 1/2010 | Sundaresan | G06F 17/30259 715/849 |
| 2010/0060662 A1* | 3/2010 | Law | A63F 13/10 345/629 |
| 2010/0070859 A1* | 3/2010 | Shuster | A63F 13/358 715/706 |
| 2010/0073468 A1 | 3/2010 | Kutner | |
| 2010/0110073 A1* | 5/2010 | Abraham | G06Q 30/06 345/420 |
| 2010/0157021 A1* | 6/2010 | Abraham | G06Q 30/06 348/47 |
| 2010/0245538 A1 | 9/2010 | Marzano et al. | |
| 2010/0306655 A1 | 12/2010 | Mattingly et al. | |
| 2010/0331065 A1 | 12/2010 | Hormigo Cebolla et al. | |
| 2011/0096136 A1 | 4/2011 | Liu et al. | |
| 2011/0159451 A1 | 6/2011 | Kuo et al. | |
| 2011/0202856 A1 | 8/2011 | Handley et al. | |
| 2011/0265019 A1 | 10/2011 | Ecevit et al. | |
| 2011/0301760 A1 | 12/2011 | Shuster et al. | |
| 2012/0038739 A1* | 2/2012 | Welch et al. | 348/14.01 |
| 2012/0099804 A1 | 4/2012 | Aguilera et al. | |
| 2013/0127980 A1 | 5/2013 | Haddick et al. | |
| 2013/0246182 A1 | 9/2013 | Bradley et al. | |
| 2013/0254038 A1 | 9/2013 | Bradley et al. | |
| 2013/0262233 A1 | 10/2013 | Bradley et al. | |
| 2013/0278631 A1 | 10/2013 | Border et al. | |

FOREIGN PATENT DOCUMENTS

| | | |
|---|---|---|
| JP | 2004326384 A | 11/2004 |
| JP | 2005332352 A | 12/2005 |
| WO | 2007061346 A1 | 5/2007 |
| WO | 2009026726 A1 | 3/2009 |

OTHER PUBLICATIONS

Article entitled "New Experimental Website Converts Photos Into 3D Models" posted on Jan. 28, 2009 on www.sciencedaily.com <http://www.sciencedaily.com>.

Homotopy Switching model for dyad haptic interactrion in physical collaborative risks, Paul et al., 2009.

Semi-autonomous robot as a medium for family communication and education, Lee et al., 2009.

Virtual avatar control using wireless sensors, vol. 6, No. 2, Feb. 2011.

* cited by examiner

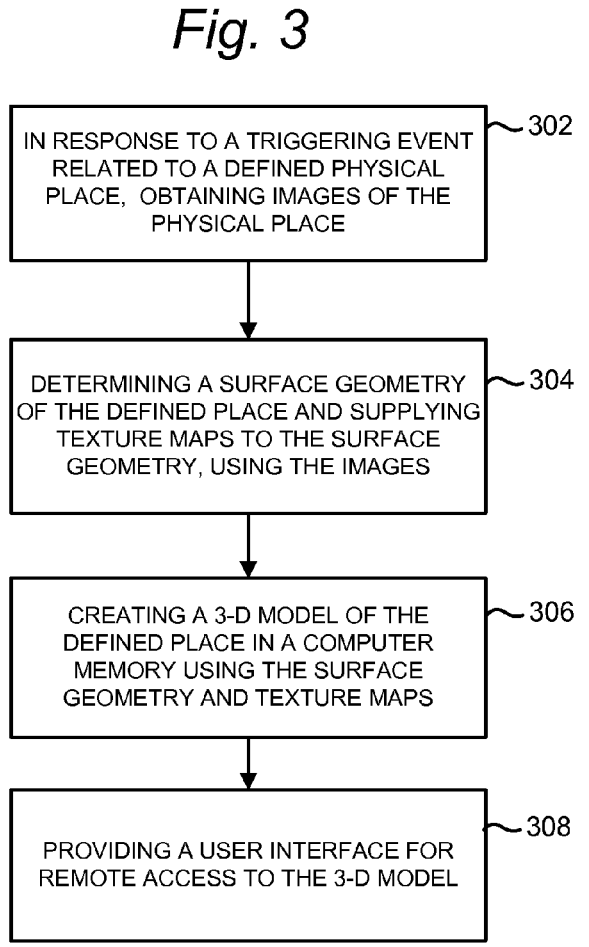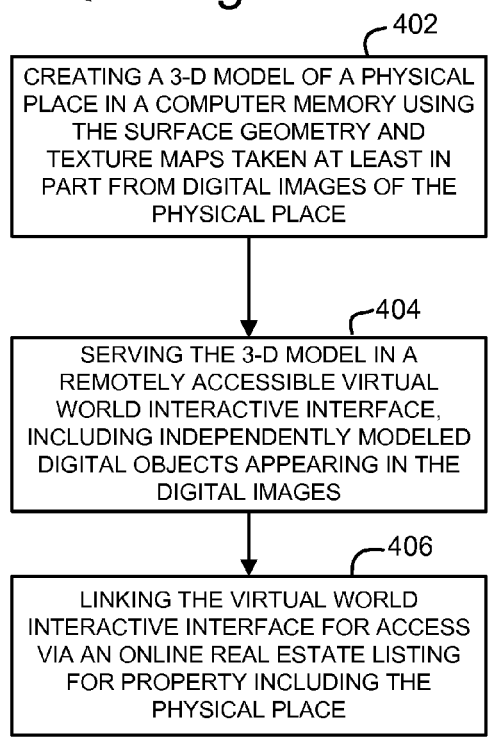

502: LINKING A ROBOTIC DEVICE PLACED IN A PHYSICAL PLACE TO AN INTERACTIVE INTERFACE INCLUDING A VIRTUAL 3-D MODEL OF THE PLACE

504: TRACKING VIRTUAL MOTION OF AN AVATAR IN THE INTERACTIVE ENVIRONMENT RELATIVE TO THE VIRTUAL 3-D MODEL

506: CONTROLLING MOVEMENT OF THE ROBOTIC DEVICE IN THE PHYSICAL PLACE TO INDICATE VIRTUAL MOTION OF THE AVATAR IN THE VIRTUAL 3-D MODEL

508: EMITTING A BEAM OF LIGHT FROM THE ROBOTIC DEVICE TO INDICATE A DIRECTION OF GAZE OF THE AVATAR

CREATION AND USE OF VIRTUAL PLACES

CROSS-REFERENCE TO RELATED APPLICATION

This application is a continuation application Ser. No. 13/155,380, now U.S. Pat. No. 8,694,553, which claims priority pursuant to 35 U.S.C. §119(e) to U.S. provisional application Ser. No. 61/352,071, filed Jun. 7, 2010, to U.S. provisional application Ser. No. 61/352,237, also filed Jun. 7, 2010, and to U.S. provisional application Ser. No. 61/375,394, filed Aug. 20, 2010, which applications are specifically incorporated herein, their entireties.

BACKGROUND

1. Field

The present disclosure relates to computer services for entertainment, education and commerce.

2. Description of Related Art

Planning residential space utilization can be a difficult problem for ordinary consumers to manage without professional help, yet the cost of professional assistance cannot be afforded for many people. Three-dimensional computer modeling tools exist to assist in space utilization, but setting up such tools for use in planning a particular space configuration in beyond the abilities of many people who might otherwise be able to make use of such tools. Space planning is a problem that often arises in the context of residential real estate, particularly when considering the purchase of a new home. However, numerous practical considerations such as affordability of professional services, computer skills, time, and access to properties for sale have made it impracticable for most people to make use of computer modeling in the selection of residential real property.

Similar barriers have prevented widespread use of computer modeling as an educational or entertainment tool in the fields related to current events, for example, in news reporting or related commentary. News organizations often supplement content provided on broadcast channels or in print with Internet content, sometimes including interactive applications, to attract readers and increase page views. However, cost-benefit considerations prevent the widespread use of computer modeling to report or comment on current news events.

With increasing mobility and dispersal of people throughout the world, people with an interest in viewing live events, such as sporting events for their "home" team, find themselves increasingly unable to attend such events due to geographic distance and other factors. In addition, many people find it inconvenient, undesirable, or even dangerous or, for this with mobility problems, impossible to attend such events.

In addition, there is a need to allow people to better enjoy sporting or other events by sitting close to action on the playing field, or even having a point of view within the action. There are a limited number of seats near the action, so that even if people are physically able to attend a baseball game, for example, there are a limited number of seats behind home plate. Similarly, certain seats are impossible to occupy, such a seat on the pitcher's mound.

SUMMARY

The present disclosure presents a method, system and apparatus for creation and use of virtual places. In an aspect, a method for providing a virtual 3-D model of a defined physical place may include obtaining images of a physical place. The images may be obtained in response to a triggering event related to the defined physical place. The method may further include determining a surface geometry of the defined place and supplying texture maps to the surface geometry, using the images. The method may further include creating a 3-D model of the defined place in a computer memory using the surface geometry and texture maps, and providing a user interface for remote access to the 3-D model.

In additional aspects, the method may further include monitoring queries provided to a search engine to detect the triggering event comprising a rate of queries including an identifier for the defined physical place exceeding a threshold. The method may further include monitoring a current popularity of online news stories to detect the triggering event comprising a relative popularity of online articles that include an identifier for the defined physical place exceeding a threshold. The method may further include monitoring a real estate listing to detect the triggering event. The method may further include monitoring a news feed to detect the triggering event comprising a newsworthy event taking place at the defined physical place. In such case, the obtaining of the images may include obtaining video or photographic images from news reports of the newsworthy event. The method may further include enabling use of the 3-D model in an online virtual world environment, to provide the user interface. In addition, the method may further include obtaining the images by querying an image database. The method may further include processing selected ones of the images to remove objects smaller than a specified size from the selected images, in response to a user declutter request.

In a separate aspect, a method for configuring a physical space may include creating a 3-D model of a physical place in a computer memory using the surface geometry and texture maps taken at least in part from digital images of the physical place. The method may further include serving the 3-D model in a remotely accessible virtual world interactive interface, including independently modeled digital objects appearing in the digital images. The method may further include linking the virtual world interactive interface for access via an online real estate listing for property including the physical place.

In additional aspects, the method may further include receiving input specifying a minimum object size, and decluttering the 3-D model by removing objects smaller than the minimum object size. The method may further include enabling a user to select ones of the independently modeled objects for removal from the 3-D model, using the virtual world interactive interface, and creating a record of remaining ones of the modeled objects in response to user removal of one or more of the modeled objects. The method may further include enabling the user to select additional modeled objects from a catalog for adding to the 3-D model, and creating a record of selected ones of the additional modeled objects in response to user selection of one or more of the additional modeled objects. The method may further include enabling the user to determine placement of the remaining ones of the modeled objects and the selected ones of the additional modeled objects in the 3-D model, and creating a placement record. The method may further include generating an order for staging the physical place, using the record of remaining ones of the modeled objects, the record of selected ones of the additional modeled objects, and the placement record.

In a separate aspect, a telepresence method may include linking a robotic device placed in a physical place to an interactive interface including a virtual 3-D model of the place. The telepresence method may further include tracking virtual motion of an avatar in the interactive environment relative to the virtual 3-D model. The telepresence method may further include controlling movement of the robotic device in the physical place to indicate virtual motion of the avatar in the virtual 3-D model. The telepresence method may further include emitting a beam of light from the robotic device to indicate a direction of gaze of the avatar. The telepresence method may further include operating an audio link between the robotic device and a user controlling the avatar in the interactive environment. The telepresence method may further include projecting an image from the robotic device to indicate a position of the avatar in the virtual 3-D model. The telepresence method may further include projecting the image from the robotic device including an image of a user controlling the avatar in the interactive environment.

Aspects of the above methods and similar methods may be embodied in a computing device comprising a processor, a memory, and a network interface. The memory may hold instructions that, when executed by the processor, cause the computing device to perform method and operations as described above.

Further examples and details of the present technology may be obtained from the following detailed description. The drawings referenced in the detailed description are first described briefly.

BRIEF DESCRIPTION OF THE DRAWINGS

FIG. 3 is a flow chart showing an example of creating a using a virtual 3-D space in a news or education application.

FIG. 4 is a flow chart showing an example of creating a using a virtual 3-D space in a real estate application.

FIG. 5 is a flow chart showing an example of a telepresence method.

DETAILED DESCRIPTION

Figure 1:
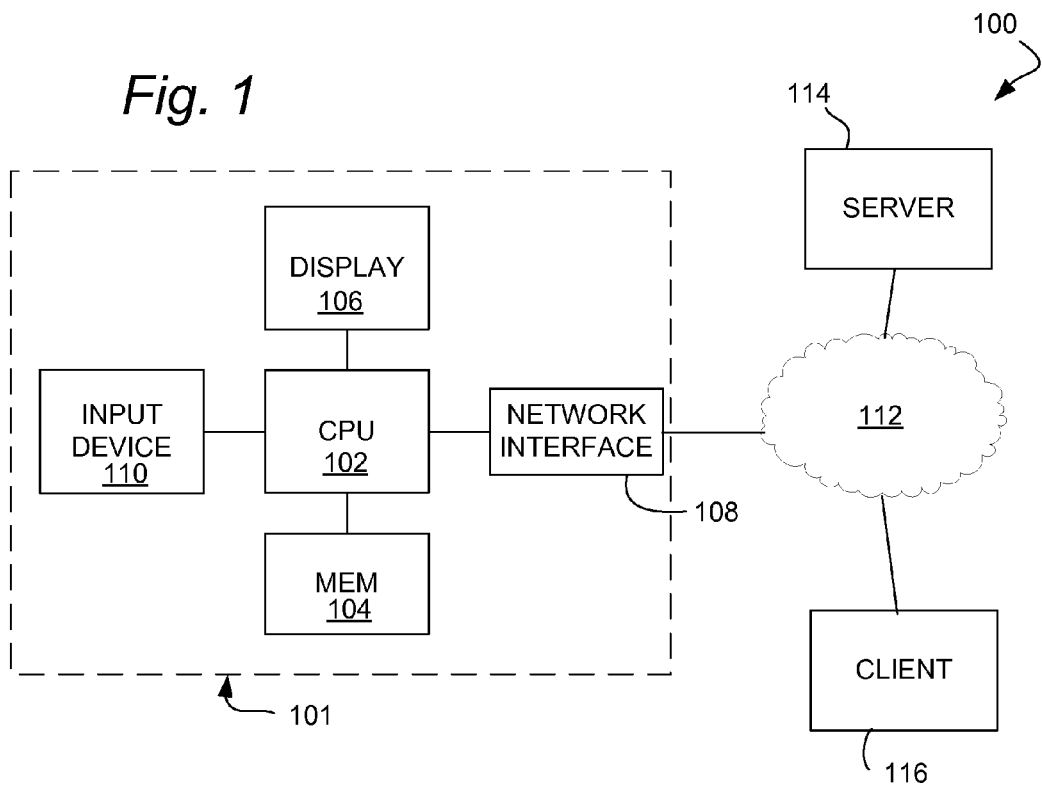
FIG. 1 is a block diagram showing an example of a system for performing one or more methods as described herein related to creation and use of a virtual 3-D space.

It is desirable, therefore, to provide a control method, system and apparatus for creation and use of virtual places in education, entertainment and commerce that provides features not provided in the prior art.

The headings set forth below are merely to aid organization and readability of the disclosure, and do not limit the disclosed examples or concepts.
Real Estate and Space Configuration A group of photographic images, measurements, video segments, or a combination thereof is used to image and/or measure a physical place or facility, such as a residence, and optionally some or all of its contents. In an aspect, two dimensional photographic images may be utilized in combination with software that converts two dimensional images into three dimensional models, such as by using the Make 3d algorithm developed by computer scientists at Stanford University, or a similar method. Objects of known size may optionally be used to provide scale. For example, a dollar bill seen sitting on a table is of known size, and may be utilized to determine the size of the objects in the room.

The image may be converted into a three-dimensional (3-D) computer model, sometimes referred to herein as a 3-D virtual model, using a semi-automated or automated algorithm operating on input images and optionally, measurements. The three dimensional model may be comprised of a plurality of three dimensional objects, and may be configured so as to allow additional three dimensional objects to exist within the three dimensional model. Actual images of objects, walls, or other elements from the facility may be used to generate the textures utilized to provide texture or realism to each model. For example, a wall within the facility may be covered with patterned wallpaper. The image of the wall, covered by wallpaper, is then used as a texture map for the wall, making the wall appear not just dimensionally representative of the wall in the physical facility, but visually representative as well.

In an aspect, the signal strength of at least one of a plurality of signals, such as an 801.11N network signal, a cellular telephone network signal, a cordless telephone signal, or a cellular data network signal, is measured and recorded during the imaging of the facility. The signal strength at various selected locations within the place to be modeled may be recorded in a data structure for use with the 3-D virtual model. The signal strength represents a location-specific parameter that may be of interest to a person who later uses the model to obtain information about the place that the model represents.

In another aspect, the semi-automated or automated algorithm identifies independent objects within the place or facility, for example, tables, chairs, beds, or other furnishings. These objects may then be modeled independently as objects that can be independently manipulated within the 3-D virtual model of the place. Thus, for example, a bedroom might be imaged and a three dimensional space representing the bedroom would be generated, together with three dimensional objects representing the bed, the nightstand, the television, the dresser, and, in some implementations, even some fixtures that could be moved via alteration of the physical facility, such as light switches, power plugs, and overhead lights. These objects can then be rearranged by users of the facility, replaced with objects drawn from a retail style catalog, or otherwise manipulated independently of each other and of the facility.

In an aspect, "anchor points" representing physical characteristics of the place being modeled, for example, windows, doors, power plugs, telephone, cable, and network plugs, wireless signal strength, air conditioning and heating vents, smoke detectors, and similar relatively fixed characteristics of the facility, are mapped or recorded. Proximity, strength, or other characteristics of the anchor points may be used to guide, limit, or assist users in later manipulation of objects within the facility. As an example, a user determining where a new television might fit within a room might specify that the television's six foot long plug must reach an outlet, should be located where a cable can be run to the television from a cable outlet without crossing a walkway, and should be located where adequate wireless network signal may be received. User interface software for using the 3-D virtual model may then provide the user with a series of suggestions, ratings, or other indicia of appropriate placement of a new television.

In an aspect, the mapped facility is made available via a wide area network. Via network access, users such as interior designers or the like may be granted access to a 3-D virtual model of or a residence or other private space to assist with design ideas. Data from merchants may be incorporated so that a user may place new furniture, artwork, or other items within the 3-D virtual model to determine fit, look, placement and other factors normally known to the user only after physically placing the items in the facility, or known roughly to the user by utilizing physical measurements of length of walls and similar characteristics.

A virtual facility using 3-D model of the physical place may be provided in an online multi-user environment virtual world environment, or as a stand-alone virtual facility, using virtual world software. An owner or manager of the virtual facility may invite others, in the form of imaged persons, avatars, or other representative agents, to be present virtually within the virtual facility. Real time events within the virtual facility may be transmitted over the network to other users. Similarly, real time events may be simulated, such as by embedding a video feed over the television object within the facility. The simulated event may correspond to an actual event taking place within the corresponding physical facility, but need not do so.

In another aspect, an automated "declutter" feature is used during creation or use of the 3-D virtual model, whereby items meeting specified criteria are automatically hidden or, optionally, not added, to the virtual facility or portions thereof. The declutter feature may operate as an image processing or modeling tool that excludes objects smaller than a defined size from a designated part or all of a 3-D model. The defined size threshold may be defined by the user. For example, a user may select a bathroom area for decluttering any objects having a largest dimension less than 12 inches, causing the decluttering to exclude medicine bottles, toothpaste tubes and similar clutter from appearing in the 3-D virtual model of the bathroom. Decluttering may be performed at an image processing level to remove specified objects from images used in creation of a 3-D virtual model, either before or after the model is created. In the alternative, the 3-D virtual model may be generated with independent models for all objects appearing in the initial images, and smaller modeled objects selectively removed from the space using a size feature. Of course, when objects are independently modeled, an owner of the virtual space may simply select and remove any undesired objects using a selection tool.

In another aspect, a selective object viewing feature is provided. Optionally, a user may determine that certain objects (including areas) are shown only to persons with permissions to see those objects, or to no persons. Thus, for example, family members may be permitted to see the bedrooms and their contents, and the master bathroom, but not its contents. Continuing the example, non-family members virtually visiting the facility may be restricted from viewing such objects or entering those areas. For further example, permission from the owner or manager of a virtual place may be required to enable a user to view object of less than a specified size, or objects that are specially designated as private objects.

The creation and use of virtual places may include a real time or near real time news location reconstruction and touring facility. Utilizing video, stills, and other images or descriptions from the site of a news event, together with pre-existing models of that site, if any, a virtual representation of a place related to a news event may be created. This may take the form of monitoring various news channels and combining news feeds from third party sources, closed captioning data, OCR of text overlays on the screen and text within the images (for example, an address painted on a curb), to determine that a facility is being shown. The facility is then reconstructed in virtual 3D form and set up online as a self-contained virtual environment, using any suitable virtual world hardware/software system. In the alternative, the virtual 3D model of a news site may be includes as part of an existing virtual world system. In either case, users may enter and tour the virtual news site by remotely accessing the news site.

A virtual tour of a plurality of facilities is also disclosed, whereby the facilities may be arranged in a manner that does or does not correspond to their actual physical locations. For example, a tour of stars homes may be implemented where existing images of home interiors, for example from MTV's "Cribs", from blueprints on file with planning agencies, or from a combination of one or more of those or other sources, are used to generate virtual 3D copies of such homes. The homes may be placed adjacently on a virtual street, or located within a mapping system that reflects their real world locations, or in some combination of actual and artificial locations. Such facility may be integrated with a satellite view mapping system, such as Google Maps or Google Earth, so that a user may be guided virtually through a map or image of the area to the house, at which point the user would enter the inventions disclosed herein and be able to tour the interiors.

Users may be allowed to modify the interiors in a non-destructive manner by creating a different dimension or separate forked implementation of the facility, whereby their changes are viewable to them only, to those they permit to see them, to viewers who desire to see the forked implementation, or to such other group as the user or system operator determines.

A virtual shopping facility is disclosed whereby a user is presented with a one or more images of a possible purchase located within the virtual facility. A virtual sales person is disclosed, whether operated by a human being, and automated process, or a combination thereof. The user may, in one implementation, be presented with a plurality of side-by-side or sequential images showing different optional purchases in place within a home. As an example, a user seeking to purchase a new television may view numerous televisions placed in one or a plurality of locations within the room where the television is to be placed. The salesperson may optionally assist by moving various items within the room to rearrange the organization of the room to assist in reaching a pleasing arrangement. Advantageously, the end user may thereby receive the benefit of modeling expertise without having to pay a discrete fee; instead, training costs and the like may be absorbed as a general marketing expense.

A wheeled, flying, otherwise mobile, or stationary camera, audio feed, or a plurality of the one or more of those devices may be utilized to update the arrangement, contents, and status of the facility. In one implementation, various fixed cameras are used. Such audio and/or video facilities may also be used to virtually tour the facility in real time.

An indicator light, sound, or actual object is disclosed that permits persons actually within (or virtually within or viewing) the facility to identify the location and/or direction of view of a person virtually within the facility. For example, a virtual visitor looking at a painting may be indicated by the presence of a laser pointer dot on the painting. The laser dot may be configured to indicate a particular user, for example using computer-controlled mirror system to generate a visual pattern unique to the person that is indicated. This indication may be accompanied by, or take the form of, a video image. For example, in the real facility, a projection system may be used to place a projected image of a viewer on an object, indicating that the viewer is looking at the object. In addition, an audio system may be used to play an audio feed from the user, or to provide an audio feed from the physical facility to the virtual facility in the virtual environment. In this way, a virtual visitor looking at a painting could may with those physically present within the facility using the audio system connected to a computer network, and discuss the painting or other things. Those physically present would have an indication of the direction of gaze of the virtual visitor, which may be identified by following the virtual visitor's pupils, or simply by indicating the general field of view available to the virtual visitor, the direct gaze of the visitor's avatar, or the center of the field of view of the visitor.

A shopping and delivery system may be provided whereby users purchase items they want within their physical facility, and delivery personnel are provided with a plan and are provided with instructions as to how to deliver and where to install the purchased items. For example, the delivery personnel may be granted access to the corresponding virtual facility or a printout or other plan generated therefrom. In addition, such a plan may include an indication of placement of the items to be delivered within the space. For example, if the salesperson virtually moved a couch to make room for a television, the installers may be instructed to do the same within the real facility. Installers may update the image of the virtual facility, or simply indicate that the alternative arrangement proposed by the sales person had been implemented, thereby updating the arrangement of the facility.

A permissions and sales system may be provided whereby items purchased or available for purchase in the real world may be displayed within the virtual facility. In an aspect, items, particularly brand name items, present in the real world may be licensed to appear in the virtual world. In this manner, a Sony television in the real world facility would be permitted to appear within the virtual facility. A prohibition may be imposed on the presence of some categories of items, including all categories of items, or particular items, within the virtual facility unless (or optionally regardless of whether) they are present within the real world facility. Items may be licensed or placed within the virtual facility on paid or other terms. Items not owned in the real world may be purchased or otherwise acquired and displayed within the virtual facility.

An automated and partially automated "staging" system is disclosed, whereby real estate listed for sale or rental in the real world is imaged and used to create a 3-D virtual model. Objects and furnishings present in the virtual facility may be removed using a decluttering feature, or selected objects may be removed using manual selection. Then, the virtual facility is furnished using virtual furnishings and other modeled items selected from a catalog or library of items professionally prepared and collected for staging real estate, whether residential or commercial. The selected virtual furnishings are staged within the virtual version of the real estate, optionally using the services of an interior decorator or other trained person. The virtual items for staging may be added to models of existing furnishing already present in the real facility and modeled in the virtual facility. A preferential weight may be assigned to items that are less expensive to place within the facility, such as items that weigh little, that require the removal of fewer existing furnishings, and so forth. When a person indicates interest in the property, the real home may staged in a manner that matches the staging of the virtual home before the interested person is given access to the real home for consideration of purchasing it. The staging system may be done automatically via algorithms, via a system where the algorithms make some or all of the initial choices but a real estate agent or other person makes changes or corrections, or by a system where the person is assisted in their choices. For example, the person doing the staging may be being presented with lists of places where an object might fit, or be enabled able to virtually move objects around in the virtual facility using a 3-D modeling application.

The use of the virtual facility to redecorate or to alter the appearance of the facility may be assisted in the same or a similar manner. In this way, a user might hire a virtual interior designer who is able to work with the user to redesign the home, with the computer handling the details such as whether an item fits in a given space, proximity to electrical outlets, adequacy of natural or artificial light, and other factors.

Virtual Box Seat:

In another aspect, creation and use of virtual places includes virtual box seats, whereby those people choose to attend an event by viewing it off-site in virtual box seats. In an aspect, a variant of the inventions might operate as follows: An enclosed or semi-enclosed area is located within another establishment, such as a restaurant. The area is referenced herein as the "virtual box". The virtual box preferably contains one or more displays, preferably capable of displaying moving images in three dimensions. In an aspect, such displays would not require the use of 3-D glasses, such as prototype displays introduced by display manufacturers in 2010. The virtual box is connected to one or more cameras, preferably capable of transmitting three dimensional images, which cameras are located at the event to be watched via the virtual box.

Taking as an example watching a hockey game from a virtual box, cameras may be placed behind each goal, at edge of the ice near the center line, and above the hockey rink in a position corresponding to traditional stadium boxes. The video feed to the virtual box may be controlled to enable user switching between viewpoints from within the virtual box. Fans of the home team might choose to locate their virtual box behind the away team's goal during the first period, at the center line during the second period, and behind the home team's goal during the third period, for example. In an alternative implementation, the cameras may track the action, so that the virtual box point of view moves with the play either in real time, at the start of each play, as dictated by a rule set created by the team, box users, or other party, or one demand. "Tracking the action" could involve smooth tracking, as might be facilitated by a camera on rails, or "jump" tracking, where the virtual location jumps from one to another of a plurality of cameras. Alternatively, smooth tracking may be accomplished by digitally combining portions of the points of view of a plurality of cameras where the camera images overlap or abut each other. In this manner, imagine that 100 cameras are used, set back slightly from the ice, one every six feet, to ring a hockey rink. The point of view of each camera covers seven feet. By combining the full or partial view from multiple cameras, it is possible to digitally move the point of view of the virtual box freely, to simulate any position around the hockey rink. Used in conjunction with football, for example, the box might be made to move—virtually moving its point of view—to line up the virtual box point of view to match the location of the football at the start of each play.

Multiple boxes may be used simultaneously, each sharing the same virtual position on the field. Regardless of the extent virtual position on the field, each box may have a side wall looking in on another virtual box. In this way, a husband deployed with the military in Iraq might enjoy a seat in a virtual box next to his wife, in a different virtual box in Los Angeles. The shared wall would, in an aspect, be contiguous with the image on the front of the virtual box, so that it would appear when looking at the front right corner of the box, where the front image and the adjoining virtual box image join, as if the user is actually sitting next to the occupants of the second virtual box. The transmission of images between the boxes may be three dimensional as well. Such transmission could be "muted", blanked, or otherwise controlled by users in one or both boxes, either by individual choice or by consensus. The virtual positions of the two adjoining boxes may be set so that the displays in each box correspond to the view of the field that would exist if the boxes were actually adjoining. Alternatively, the boxes could enjoy differing views. The portion of the video on the side of the virtual box that looks out at the field (i.e. a person in a virtual box looks to the right and sees, on the right wall, part of the field, and the people on the box to the right) may be controlled to display the view that the users of the virtual box would expect to see if the boxes were located in virtual adjacent positions relative to the field, even if the boxes are located in virtual non-adjacent positions. Alternatively, such portion of the view may reflect what the persons in the adjacent box actually see, even if positioned in a non-adjacent virtual position. Finally, a combination make be used, where there is an indicator of the view available through the other virtual box, in one implementation by displaying the view available on the other virtual box in some other place in the first virtual box, such as on the back wall. Optionally, the back wall may also be used to display fans (or real, stock footage, avatars, or artificially generated). Optionally, the back wall, ceiling, overlays to the front wall, or other surfaces may be used to carry additional game data, data related to other events, or additional views of the game. In this manner, for example, a single box may contain a front-facing wall showing the view from the home team's goal, and a back wall showing the view from the away team's goal.

When adjacent boxes are connected, the distance between the location of each box and the location of the original event may create timing problems. For example, a user in Sydney, Australia viewing a game from a virtually adjacent box to his brother in London, where the game originates in Los Angeles, Calif., might have to endure a 500 ms delay in the transmission of the video from the game to his box, and a 250 ms delay in the transmission of his reaction to the other box in London and a 100 ms delay in the transmission of the game to London. To prevent the delay from impairing the realism of the experience (such as by seeing the fans in the London box cheering a fraction of a second before a goal is scored), the virtual boxes and/or the head end at the event and/or the head end transmitting the event, or a combination thereof, exchange timing data and agree on a delay greater than or equal to the minimum delay necessary to ensure near-simultaneous reception and transmission of reactions and events. Thus, the transmission of game events to London might be delayed an additional 1900 ms, making the events take 2000 ms to display in London. The transmission of game events to Sydney might be delayed an additional 1500 ms, for a 2000 ms delay in game transmission to Sydney. Optionally, the connection speed between the boxes would be made identical (so if three boxes were adjacent, similar leveling technology ensures simultaneous transmission of reactions to all boxes). The portion of the side view showing action on the field would be delayed by a different amount than the audience portion, ensuring that all views of the field action are timed to correspond to each other (so that the portion viewed in the side view are not displaced temporally from the front portions). Where one of the side views is not an adjoining virtual box, but a real physical box or simply actual stadium seats, the side view should preferably share the delay utilized by the front view.

The virtual point of view may actually be on the field. In an aspect, the cameras are placed in front of any visual barriers (such as plexiglass in hockey), or such barriers are digitally removed. The box seats could thus appear to be directly on the ice. In football, for example, the box seat might be virtually located directly on the goal line. The point of view may also be altered digitally to move up and down the field with the action.

The ambient sound level may be controlled by the users of the virtual box. For example, users watching a concert might make it louder or quieter. The location of the sound receivers need not correspond with the point of view in use in the virtual box. The location of the apparent sound reception may be digitally or otherwise altered to correspond to the virtual position of the box as the box moves virtually around the field.

The box may be licensed or sold to a user group on a plan where the food or other accoutrements are included. In an aspect, a door to the box is located in a location similar to that where a door would be located in a physical box seat. Preferably, the door is adorned with an image transmission device (for example, another 3-D monitor) so that the door disappears or at least blends into the other portions of the display when not in use.

For events where items need to be transmitted to the event or from the event, printers, 3-D printers, t-shirt printers, money reception and transmission devices, haptics interfaces, and similar devices are integrated. For example, a user in the virtual box may wish to visit the souvenir stand. One side wall becomes the souvenir stand. The user finds a t-shirt he wants and orders it. It may be then printed on a t-shirt printer located in or near the box location, or, in the alternative shipped to an address specified by the user or to the location of the box. In another example, a user may be watching a private magic show or dance and wish to tip the performer. The user puts a bill into a bill receptor in the virtual box or charges a credit card, and a bill or some other token or indication that a payment has been made for the performer emerges from a machine at the event. Note that the virtual box may be used to view night clubs, magic shows, small club concerts, large sporting events, or a completely virtualized environment such as a CGI-generated set, and other environments.

These inventions allow concert-goers to have virtual box seats on stage, in the front row, or even in a physically impossible location hovering above the audience and stage. Displays may be placed on any surface within the box, including on the floor and furnishings, and even on clothes of persons within the virtual box. One aspect of this is that it may be utilized to make it appear as if the floor or furnishings are invisible, or that the user is floating above or around the event.

Existing surround sound technology is used to recreate the sound at the event.

Loud sounds or events, such as fans stomping their feet, may be accompanied by generation of vibrations in the virtual box. Other characteristics of the environment, such as smells, temperature, winds, or rain, may be recreated within the virtual box to add to the verisimilitude. Such features may optionally be altered or declined by the users of the virtual box.

It is sometimes preferable to adopt the point of view of a player within a game, or a performer in a concert. In one implementation, one or more players, umpires, participants, or fans wear (physically or via digital reconstruction from other signals) transmission devices. Preferably, the transmission devices correspond to the view from each eye, and the sound received at each ear. The transmission is sent to the users either through the virtual box sound and video recreation facilities, through glasses, headphones, or a combination thereof. In such an implementation, users could choose to view a baseball game through the eyes of a pitcher, or feel and experience a hockey game through the eyes of a forward. When the forward is checked against the boards, the sound and visual disorientation would be shared with those in the box. A motion sensor, or an algorithm that determines when noise, video input, or a combination thereof is likely to indicate a physical impact with the player, is used to optionally create a shake motion within the virtual box.

If preferable to avoid motion sickness, limitations on the velocity with which the images may move may be implemented. Optionally, images may be reduced to two dimensions temporarily or for the duration of the event or longer.

Another implementation of these inventions is to transmit the image and/or sound data through glasses, either independently or in combination with the use of a virtual box, or in combination with a television or other video display device. In an aspect, a user may choose to virtually "inhabit" one of a plurality of players in a game, or performers in a concert, changing among players or performers as the user desires or based on a ruleset. For example, a rule for viewing baseball may specify that the view baseball is taken current batter's eyes except during a fielding play. Point of view glasses and audio input may be utilized to enhance a virtual box by providing additional points of view for individual users of a box when other users may wish different points of view.

Users of the box may optionally change games or events mid-way, during half-times, or even have different events taking place on a plurality of the walls within the virtual box. Further Examples:

FIG. 1 is a block diagram showing an example of virtual place creation and management system 100 such as may be used to perform methods described herein. System 100 may comprise, for example, a computer 101 including at least a processor or CPU 102 and a memory 104 for holding data and program instructions. When executed by the CPU 102, the program instructions may cause the computer 101 to perform one or more method and operations as disclosed herein. The computer 101 may further comprise or be connected to a display device 106 for providing a graphical or text display of software output, and a user input device 110, for example a keyboard, mouse, keyboard, microphone, touchscreen, touchpad, or some combination of these and similar input devices. The computer 101 may be in communication with a Wide Area Network (WAN) 112, for example, the Internet, via a network interface component 108.

The computer 101 may receive data including user input from a client component 116, which may be in communication with the computer 101 via the WAN 112. A client component may include hardware elements similar to computer 101, but in a form factor for client use. In an embodiment, the client 212 may be embedded in a user interface controller for a virtual box seat, an include microphone input. The computer 101 may provide output to the client 116 in response to user input. The output may include a virtual world interface for accessing a 3-D virtual model of a place, including operating a avatar within a 3-D model, editing the 3-D model or objects contain in the model, or otherwise interacting with the virtual 3-D model. In a separate aspect, the output may include video data for display on one or more surfaces inside of a virtual box seat enclosure, using a projector or other display technology.

The computer 101 may receive image data from an image server 114. In an aspect, the image data may include real-time, or near real-time video data for processing and supplying to a virtual box seat apparatus. The computer 101 may be part of such an apparatus. In a separate aspect, the image data may include image data from imaging a particular place. The computer may receive the place-related images from an image server 114, which may be implemented as a search engine for locating images on other nodes of a computer network, using an indexing system. In the alternative, the image server may be a dedicated for holding place-related data for a specific purpose, for example private real-estate related images. Image data may also be stored in the memory 104 or other memory in communication with the computer 101.

Figure 2:
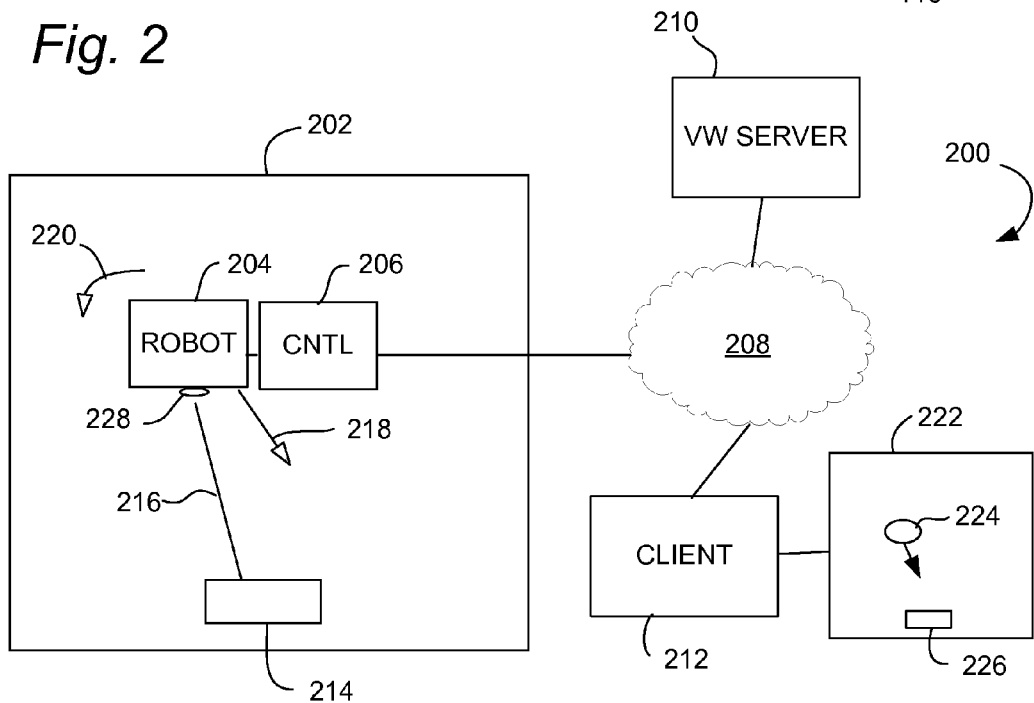
FIG. 2 is a block diagram showing an example of a system for performing one or more methods as described herein related to telepresence.

FIG. 2 is a block diagram showing an example of a telepresence system 200 for indicating information about use of a virtual 3-D model 222 inside of the physical space 202 on which the model 222 is based. The system 200 may comprise a virtual world interface server 210, which may be configured similarly to the computer 101 shown in FIG. 1. The virtual world server 210 may provide software and data to one or more remote clients 212 for accessing and using a 3-D virtual model 222 of a physical place 202, via a WAN 208. A robot 204 may be located in the physical space 202 and in communication with a controller 206. The controller 206 may be in communication with the client 212 via the WAN 208. The controller may determine the location and orientation of the robot 204 relative to the physical space 202 using a vision system or other data collection device. The robot 204 may have, but is not required to have, a locomotion system capable of moving the robot around the space 202 in translation 218 and rotation 220, under the control of the controller 206. The robot 204 may include a light emitting device 228, for example, a laser, light emitting diode, lamp, or projector. The light emitting device 228 may be controlled by the controller 206 to direct a light beam 216 or projected image in a specific direction or along a specific vector.

In operation, the server 210 may serve programs and data to the client 212 to enable interactive use of a 3-D model 222, including operating an avatar 224 inside of the model. The avatar 224 may responds to user input control from the client 212 to move within the modeled space 222. In addition, the client experiences the modeled space 222 through a viewpoint, which may be aligned with an apparent avatar view as indicated by orientation of modeled avatar eyes, may be determined independently of any avatar configuration, or may be determined based on a combination of avatar state and independent input.

In an aspect, a user viewpoint of the model space 222 may be indicated in the physical space 202 using the robot 204 and the light beam 216. For example, if the object 226 appears in the center of the field of view of the current viewpoint being used by the client 212, the controller 206 may receive viewpoint information from the client 212 or server 210 and cause the robot to direct a light beam 216 onto the corresponding object 214 in the physical space. In addition, the controller may cause the robot to move in the physical space to reflect the current position of the avatar 224 in the modeled space 222. In this way, a person inside of the physical space 202 may be kept informed of activities, especially including the gaze, of persons viewing or using the modeled space 222. This may be useful for monitoring user interest in various objects in a space. The modeled space 222 may in some instances include live video data from the physical space, for example, when a performance is going on and projected in real time or near real time inside of a surface in the physical model. The robot 204 may similarly be used to dispense tips, vouchers, or other physical objects in the physical space, in response to payments or requests made using a client interacting inside of the virtual space 222.

In an aspect as diagrammed in FIG. 3, a method 300 for providing a virtual 3-D model of a defined physical place may include obtaining 302 images of a physical place. The images may be obtained in response to a triggering event related to the defined physical place. Further variations and details for obtaining images, or triggering the obtaining of images, are described hereinabove and below. The method 300 may further include determining 304 a surface geometry of the defined place and supplying texture maps to the surface geometry, using the images. Any suitable method may be used. The method 300 may further include creating 306 a 3-D model of the defined place in a computer memory using the surface geometry and texture maps, and providing 308 a user interface for remote access to the 3-D model.

In additional aspects related to the operation 302, the method 300 may further include monitoring queries provided to a search engine to detect the triggering event comprising a rate of queries including an identifier for the defined physical place exceeding a threshold. The method 300 may further include monitoring a current popularity of online news stories to detect the triggering event comprising a relative popularity of online articles that include an identifier for the defined physical place exceeding a threshold. This may be useful, for example, in providing virtual 3-D models enjoying current popular interest due to events in the news. In addition, the method 300 may further include monitoring a news feed to detect the triggering event comprising a newsworthy event taking place at the defined physical place. In such case, the obtaining of the images may include obtaining video or photographic images from news reports of the newsworthy event.

The method 300 may further include monitoring a real estate listing to detect the triggering event. For example, a realtor may request a 3D virtual model be created and made available to aid in marketing a real estate listing. In such cases, the required images of the property may have already been obtained and made available through an online electronic listing service. The method may further include enabling use of the 3-D model in an online virtual world environment, to provide the user interface. In addition, the method may further include obtaining the images by querying an image database, which may include a search engine for image data.

The method 300 may further include processing selected ones of the images to remove objects smaller than a specified size from the selected images, in response to a user declutter request. Further details regarding features and aspects of decluttering are provided in the description above.

In a separate aspect as shown in FIG. 4, a method 400 for configuring a physical space may include creating 402 a 3-D model of a physical place in a computer memory using the surface geometry and texture maps taken at least in part from digital images of the physical place. The method 400 may further include serving 404 the 3-D model in a remotely accessible virtual world interactive interface, including independently modeled digital objects appearing in the digital images. The method may further include 406 linking the virtual world interactive interface for access via an online real estate listing for property including the physical place. Prospective buyers may therefore tour and virtually inspect a property for sale from the convenience of a remote access terminal. The virtual world interface may provide additional features and tools to assist and encourage buyers to make a purchase decision, as described in more detail above. These additional features may be integrated into the method 400.

For example, in additional aspects, the method 400 may further include receiving input specifying a minimum object size, and decluttering the 3-D model by removing objects smaller than the minimum object size. The method 400 may further include enabling a user to select ones of the independently modeled objects for removal from the 3-D model, using the virtual world interactive interface, and creating a record of remaining ones of the modeled objects in response to user removal of one or more of the modeled objects. The method 400 may further include enabling the user to select additional modeled objects from a catalog for adding to the 3-D model, and creating a record of selected ones of the additional modeled objects in response to user selection of one or more of the additional modeled objects. The method 400 may further include enabling the user to determine placement of the remaining ones of the modeled objects and the selected ones of the additional modeled objects in the 3-D model, and creating a placement record. The method 400 may further include generating an order for staging the physical place, using the record of remaining ones of the modeled objects, the record of selected ones of the additional modeled objects, and the placement record. An example scenario for using the foregoing operations for staging a property for sale has been discussed severally above.

In a separate aspect as shown in FIG. 5, a telepresence method 500 may include linking 502 a robotic device placed in a physical place to an interactive interface including a virtual 3-D model of the place, for example, via a WAN connection. The telepresence method 500 may further include tracking 504 virtual motion of an avatar in the interactive environment relative to the virtual 3-D model. In the alternative, or in addition, the method may include tracking a current viewpoint of a user independently of avatar movement. The telepresence method 500 may further include controlling 506 movement of the robotic device in the physical place to indicate virtual motion of the avatar in the virtual 3-D model. In the alternative, or in addition, the method 500 may include emitting 508 a beam of light from the robotic device to indicate a direction of gaze of the avatar. In the alternative, the beam of light may be controlled to indicate a current user viewpoint in the virtual space.

The telepresence method 500 may further include operating an audio link between the robotic device and a user controlling the avatar in the interactive environment. The telepresence method 500 may further include projecting an image from the robotic device to indicate a position of the avatar in the virtual 3-D model. The telepresence method 500 may further include projecting the image from the robotic device including an image of a user controlling the avatar in the interactive environment.

The various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

For example, the various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, an optical disc, or any other form of storage medium known in the art. An exemplary storage medium is coupled to the processor such that the processor can read information from, and write information to, the storage medium. In the alternative, the storage medium may be integral to the processor. The processor and the storage medium may reside in an Application-Specific Integrated Circuit (ASIC). The ASIC may reside in a gaming device or other system element. In the alternative, the processor and the storage medium may reside as discrete components in a gaming device or other system element.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any non-transitory medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM, DVD, Blu-ray or other optical disc storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, includes but is not limited to compact disc (CD), laser disc, optical disc, digital versatile disc (DVD), magnetic hard disk and Blu-ray disc, wherein disks usually reproduce data magnetically, while discs reproduce data optically with lasers. Combinations of the above should also be included within the scope of computer-readable media.

Processes performed by the gaming machines, or system nodes described herein, or portions thereof, may be coded as machine readable instructions for performance by one or more programmable computers, and recorded on a computer-readable media. The described systems and processes merely exemplify various embodiments of enhanced features for use in an apparatus, method or system for gaming. The present technology is not limited by these examples.

What is claimed is:

1. A method for providing a virtual 3-D model of a defined physical place, the method comprising:
   monitoring a news feed to detect a triggering event comprising a newsworthy event taking place at a defined physical place;
   in response to the triggering event, obtaining in real or near real time, video or photographic images from news reports of the newsworthy event;
   determining a surface geometry of the defined physical place using the video or photographic images;
   creating a 3-D model of the defined physical place in a computer memory in real or near real time using the surface geometry;
   providing a user interface for remote access to the 3-D model, wherein the video or photographic images used to create the 3-D model of the defined place are captured by one or more devices that are not controlled by a user of the user interface; and
   enabling an avatar operated by the user of the user interface to enter, tour and interact with the 3-D model of the newsworthy event in real or near real time.

2. The method of claim 1, further comprising monitoring queries provided to a search engine to detect the triggering event comprising a rate of queries including an identifier for the defined physical place exceeding a threshold.

3. The method of claim 1, further comprising monitoring a current popularity of online news stories to detect the triggering event comprising a relative frequency of online references that include an identifier for the defined physical place exceeding a threshold.

4. The method of claim 1, further comprising supplying texture maps to the surface geometry and using the texture maps in creating the 3-D model.

5. The method of claim 1, wherein providing the user interface comprises enabling use of the 3-D model in an online virtual world environment.

6. The method of claim 5, wherein the 3-D model includes independently modeled digital objects appearing in the video or photographic images.

7. The method of claim 6, further comprising, enabling a user to select ones of the independently modeled digital objects for removal from the 3-D model, using the user interface.

8. The method of claim 1, wherein obtaining the images comprises querying an image database.

9. The method of claim 1, further comprising processing selected ones of the images to remove objects smaller than a specified size, in response to a user declutter request.

10. A method comprising:
    monitoring a news feed to detect a triggering event comprising a newsworthy event taking place at a news site;
    obtaining digital images from the news feed, wherein the digital images include real or near real time images of elements of the news site;

determining a surface geometry of the news site and supplying texture maps to the surface geometry, using the digital images;

creating a 3-D model of the news site in a computer memory in real or near real time using the surface geometry and texture maps;

identifying and mapping anchor points;

providing a user interface for remote access to the 3-D model, wherein the digital images used to create the 3-D model of the defined place are captured by one or more devices that are not controlled by a user of the user interface; and manipulating objects within the 3-D model of the news site in real or near real time based on one or more characteristics of the mapped anchor points and based on inputs from the user of the user interface.

11. The method of claim 10, wherein obtaining of the images comprises obtaining video or photographic images from news reports of the newsworthy event.

12. The method of claim 11, wherein the method further comprises obtaining the digital images by querying an image database.

13. The method of claim 10, wherein the 3-D model of the news site is a real or near real time news location reconstruction and touring facility.

14. The method of claim 13 wherein the news location reconstruction and touring facility is a self-contained virtual environment.

15. The method of claim 13, wherein the news location reconstruction and touring facility is a part of an existing virtual world system.

16. A method, comprising:

obtaining video or photographic images of a defined physical place, wherein the video or photographic images include real or near real time images of elements of the defined physical place;

processing selected ones of the video or photographic images to remove objects smaller than a specified size from the selected images;

determining a surface geometry of the defined place and supplying texture maps to the surface geometry, using the video or photographic images;

creating a 3-D model of the defined place in a computer memory in real or near real time using the surface geometry and texture maps;

identifying independent objects within the physical place;

modeling the independent objects in real or near real time, wherein the video or photographic images used to create the 3-D model of the defined place are captured by one or more devices that are not controlled by a user of the user interface;

providing a user interface for remote access to the 3-D model and for manipulating the independent objects: and manipulating the independent objects of the 3-D model in real or near real time based on inputs from the user of the user interface.

17. The method of claim 16, further comprising enabling the user to select ones of the independently modeled objects for removal from the 3-D model.

18. The method of claim 17, further comprising creating a record of remaining ones of the modeled objects in response to user removal of one or more of the modeled objects.

19. The method of claim 18, further comprising enabling the user to select additional modeled objects from a catalog for adding to the 3-D model, and creating a record of selected ones of the additional modeled objects in response to user selection of one or more of the additional modeled objects.

20. The method of claim 19, further comprising projecting the image comprising an image of the user controlling an avatar in the 3-D model enabling the user to determine placement of the remaining ones of the modeled objects and the selected ones of the additional modeled objects in the 3-D model, and creating a placement record.

* * * * *